(12) United States Patent
Sasaki et al.

(10) Patent No.: US 7,408,740 B2
(45) Date of Patent: Aug. 5, 2008

(54) THIN FILM MAGNETIC HEAD FOR PERPENDICULAR MAGNETIC RECORDING HAVING A MAIN POLE WITH PLURAL GROOVES IN A LOWER SURFACE THEREOF AND MANUFACTURING METHOD THEREFORE

(75) Inventors: Yoshitaka Sasaki, Milpitas, CA (US); Takehiro Kamigama, Hong Kong (CN); Tatsushi Shimizu, Hong Kong (CN)

(73) Assignees: Headway Technologies, Inc., Milpitas, CA (US); SAE Magnetics (H.K.) Ltd., Shatin, N.T. (HK)

( * ) Notice: Subject to any disclaimer, the term of this patent is extended or adjusted under 35 U.S.C. 154(b) by 454 days.

(21) Appl. No.: 11/110,743

(22) Filed: Apr. 21, 2005

(65) Prior Publication Data
US 2006/0238917 A1    Oct. 26, 2006

(51) Int. Cl.
*G11B 5/127*    (2006.01)
*G11B 5/147*    (2006.01)

(52) U.S. Cl. .............................. 360/125.11; 360/125.15
(58) Field of Classification Search ................. 360/126, 360/125.11, 125.15
See application file for complete search history.

(56) References Cited

U.S. PATENT DOCUMENTS

| | | | |
|---|---|---|---|
| 4,541,026 A * | 9/1985 | Bonin et al. | ................ 360/121 |
| 4,672,493 A | 6/1987 | Schewe | |
| 6,483,664 B2 * | 11/2002 | Kamijima | ................... 360/126 |
| 6,504,675 B1 | 1/2003 | Shukh et al. | |
| 2006/0002024 A1 * | 1/2006 | Le et al. | ..................... 360/126 |

* cited by examiner

*Primary Examiner*—Allen Heinz
(74) *Attorney, Agent, or Firm*—Oblon, Spivak, McClelland, Maier & Neustadt, P.C.

(57) ABSTRACT

A thin-film magnetic head for perpendicular magnetic recording according to the present invention comprises a coil to generate a magnetic field, and a main pole layer to perform the perpendicular recording using the magnetic field generated by said coil. The lower surface as to the layer-forming direction of said main pole layer has irregularities at the medium-facing surface side end.

12 Claims, 16 Drawing Sheets

THIN FILM MAGNETIC HEAD FOR PERPENDICULAR MAGNETIC RECORDING HAVING A MAIN POLE WITH PLURAL GROOVES IN A LOWER SURFACE THEREOF AND MANUFACTURING METHOD THEREFORE

BACKGROUND OF THE INVENTION

1. Field of the Invention

The present invention relates to a thin-film magnetic head for perpendicular magnetic recording which is used to record information on a recording medium by the perpendicular magnetic recording method, and also to a method for manufacturing the same.

2. Description of the Related Art

There are two ways to record information using the thin-film magnetic head: longitudinal recording in which the magnetization directions of data bits are parallel (longitudinal) to the plane of the recording medium, and perpendicular recording in which the magnetization directions of data bits are perpendicular to the plane of the recording medium. Advantages of perpendicular recording are that the recording medium holding information is less vulnerable to thermal fluctuation, and that it can realize high recording density.

As prior arts in the magnetic recording technology of perpendicular recording, there are U.S. Pat. No. 6,504,675 and U.S. Pat. No. 4,672,493, for example.

As to the thin-film magnetic head for perpendicular recording, however, there is a problem of the pole erasure phenomenon that, while write operation of information is at rest, a residual magnetic field in the magnetic head generated during the write operation leaks out toward the recording medium and erroneously erases the information already recorded thereon.

SUMMARY OF THE INVENTION

The present invention was conducted with regard to the above-mentioned problem. Thus, an object of the present invention is to provide a thin-film magnetic head for perpendicular recording which can prevent the pole erasure phenomenon, and to provide a method for manufacturing said thin-film magnetic head for perpendicular recording.

In order to achieve the above-mentioned object, a thin-film magnetic head for perpendicular magnetic recording according to the present invention comprises a coil to generate a magnetic field, and a main pole layer to perform the perpendicular recording using the magnetic field generated by said coil. The lower surface as to the layer-forming direction of said main pole layer has irregularities at the medium-facing surface side end. The present invention provides as well a method for manufacturing a thin-film magnetic head to achieve the above object.

A manufacturing method according to the present invention is a method for manufacturing a thin-film magnetic head for perpendicular magnetic recording comprising a main pole layer to perform perpendicular recording above a non-magnetic layer as to the layer-forming direction. Said non-magnetic layer has irregularities at the upper surface thereof, and said main pole layer is formed on the upper surface of said non-magnetic layer covering at least a region including said irregularities. Also, a coil to generate a magnetic field for performing perpendicular recording is formed above said main pole layer.

DESCRIPTION OF PREFERRED EMBODIMENT

In the followings, a preferred embodiment of a thin-film magnetic head for perpendicular magnetic recording according to the present invention is described with reference to attached figures. In the figures, the same notation shows the same or corresponding portion. In the following description, the upper or lower direction (the direction of thickness) indicates the upper or lower direction in the sheet plane of FIG. 1, the width direction the direction perpendicular to the sheet plane of FIG. 1, and the longitudinal direction the left to right direction in the sheet plane of FIG. 1.

Figure 1:
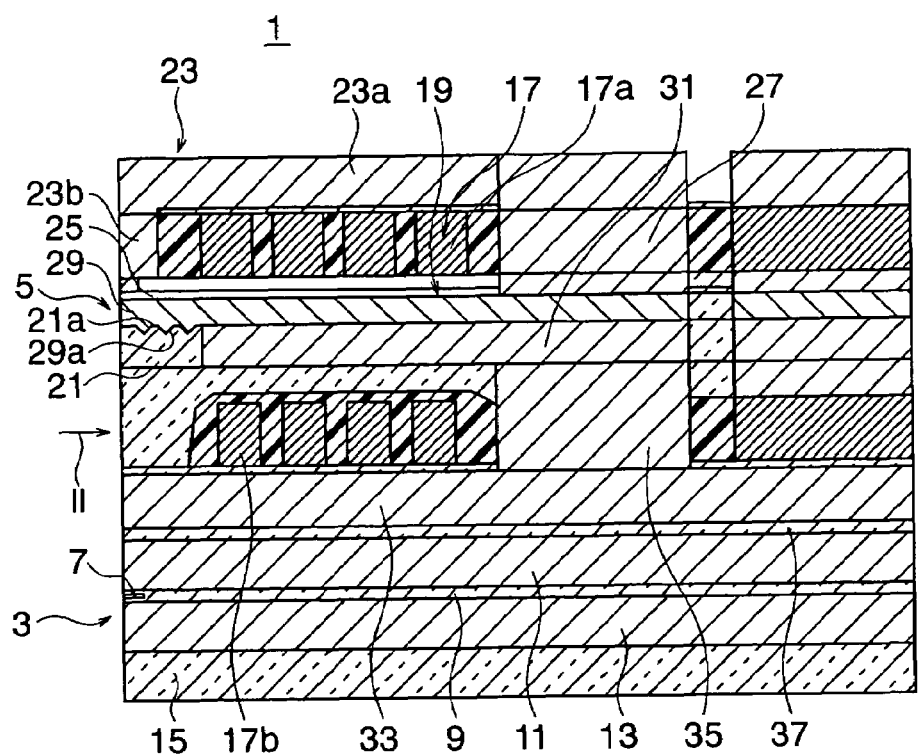
FIG. 1 is a sectional view showing the main part of a thin-film magnetic head for perpendicular magnetic recording on the medium-facing surface side, according to a preferred embodiment of the present invention.
Figure 2:
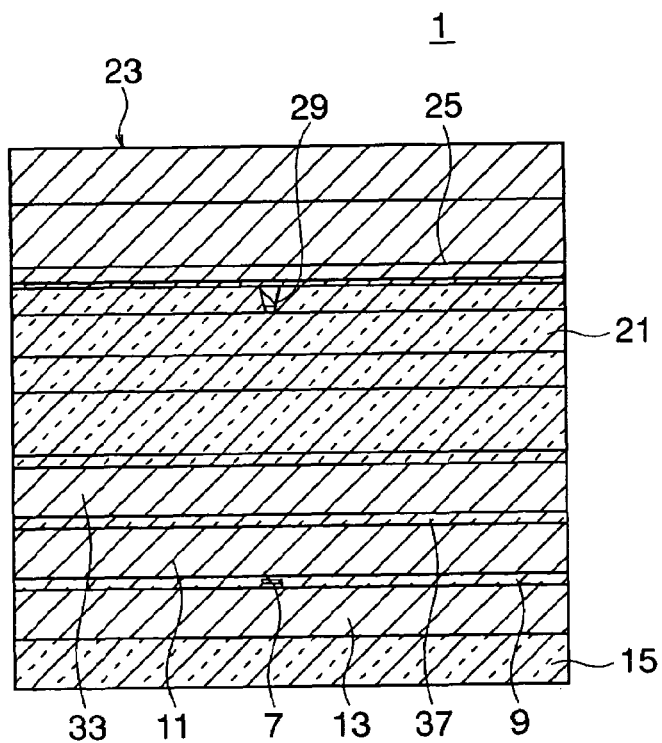
FIG. 2 is an end view of the thin-film magnetic head for perpendicular magnetic recording shown in FIG. 1 seen from the direction of the arrow II, namely seen from the medium-facing surface (ABS) side.

Referring to FIG. 1 and FIG. 2, a thin-film magnetic head for perpendicular magnetic recording 1 comprises a read element 3 and a write element 5. The read element 3 may be a publicly known and available magneto-resistance effect element 7, such as a spin valve element or a TMR (tunneling magneto-resistance) element. Detailed descriptions thereof are omitted here.

The read element 3 is arranged inside an insulating layer 9 formed out of $Al_2O_3$, for example. The insulating layer 9 is placed between an upper shield layer 11 and a lower shield layer 13. The upper shield layer 11 and the lower shield layer 13 are formed out of NiFe, for example. The lower shield layer 13 is formed on a given base body 15.

The write element 5 is provided above the read element 3 as to the layer-forming direction. The write element 5 comprises mainly a coil 17, a main pole layer 19, a non-magnetic layer 21 and a write-shield layer 23.

The coil 17 has a first coil portion 17a shaped above the main pole layer 19 as to the layer-forming (film-forming) direction, and a second coil portion 17b below the main pole layer 19 as to the layer-forming (film-forming) direction. Each of the first coil portion 17a and the second coil portion 17b goes repeatedly around an axis nearly perpendicular to the main pole layer. The coil portions are formed out of conductor material such as Cu or the like.

The write-shield layer 23 is provided opposite to the main pole layer 19 through a part of the coil 17, that is, a part of the first coil portion 17a located on the medium-facing surface (ABS; air bearing surface) side. The write-shield layer 23 has a portion 23a elongated nearly in parallel with the main pole layer 19 and a portion 23b extending downward at the medium-facing side end to approach the main pole layer 19. The write-shield layer 23 is formed out of magnetic material such as CoNiFe.

The medium-facing surface side portion 23b of the write-shield layer 23 is set apart from the main pole layer 19 by a write-gap layer 25 located therebetween. The write-gap layer 25 is formed out of $Al_2O_3$, for example. On the other hand, the portion 23a of the write-shield layer 23 opposite the medium-facing surface is connected to the main pole layer 19 through a back-gap layer 27. The above-mentioned first coil portion 17a goes repeatedly around the back-gap layer 27. The back-gap layer 27 is formed out of magnetic material such as CoNiFe.

The main pole layer 19 includes components to perform perpendicular magnetic recording by means of the magnetic field generated by the coil 17, and in the present embodiment, the main pole layer 19 comprises a main pole film 29 and a lower yoke-pole film 31. The main pole film 29 is formed out of magnetic material such as CoNiFe or NiFe, and the lower yoke-pole film 31 out of magnetic material such as CoNiFe, respectively.

The main pole film 29 is provided on the upper surface of the lower yoke-pole film 31. The medium-facing surface side end of the lower yoke-pole film 31 terminates at a position more apart from the medium-facing surface (more right-hand side in the sheet plane of FIG. 1) than the medium-facing surface side end of the main pole film 29. Thus, a non-magnetic layer 21 is provided at a position which is under the main pole film 29 and is on the lateral of the medium-facing surface side of the lower yoke-pole film 31. The non-magnetic layer 21 is formed out of non-magnetic material such as $Al_2O_3$.

Irregularities 29a are formed at the lower surface of an end part of the main pole film 29 on the medium-facing surface side, that is, at the lower surface of a part being more elongated to the medium-facing surface side than the end of lower yoke-pole film 31 and being formed on the non-magnetic layer 21. Moreover, corresponding to the irregularities 29a at the lower surface of the main pole film 29, irregularities 21a are formed at the upper surface of a part of the non-magnetic layer 21 on which the main pole film 29 is formed.

Due to an effect of the irregularities of 21a and 29a, a crystal structure above the irregularities 29a in the main pole film 29 is less uniform than the structure above the lower surface having no irregularities 29a. Details are described later in the descriptions regarding to methods according to the present invention. These irregularities 21a and 29a are configured in a manner containing a plurality of parallel grooves elongated in the width direction.

As shown especially clearly in FIG. 2, the main pole film 29 in the main pole layer 19 is narrower in width than other layers such as the write-shield layer 23 (the same holds for the read element 3). Also, the main pole film 29 has a trapezoid-shaped end-face seen from the medium-facing surface side.

Below the main pole layer 19, a shield layer 33 and a back-gap layer 35 are provided, as well as the second coil portion 17b. The shield layer 33 and the back-gap layer 35 are formed out of magnetic material such as NiFe.

The shield layer 33 is formed above a shield layer 11 through an insulating layer 37 therebetween. The back-gap layer 35 connects a portion opposite to the medium-facing surface of the lower yoke-pole film 31 in the main pole layer 19 to the shield layer 33. The second coil portion 17b goes repeatedly around the back-gap layer 35.

In addition, the following holds well throughout the manufacturing processes in any embodiments according to the present invention. The thin-film magnetic head for perpendicular magnetic recording 1 is usually produced by repeating layer formation of a plurality of layers, for the convenience of manufacturing procedure. However, when a plurality of layers are formed out of the same materials, it may be formed at a time as an integrated part, if the manufacturing processes allow or will allow in the future.

Figure 3:
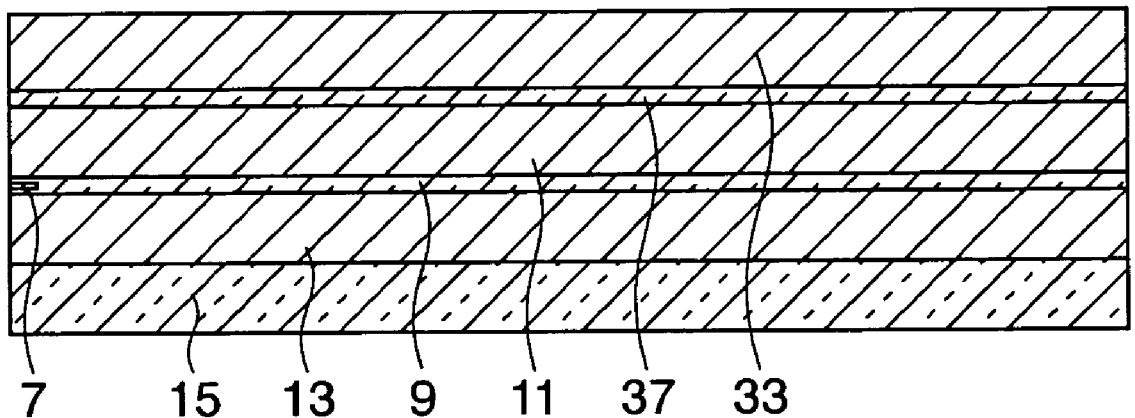
FIG. 3 is a diagram illustrating a manufacturing process of the thin-film magnetic head for perpendicular magnetic recording shown in FIGS. 1 and 2.
Figure 4:
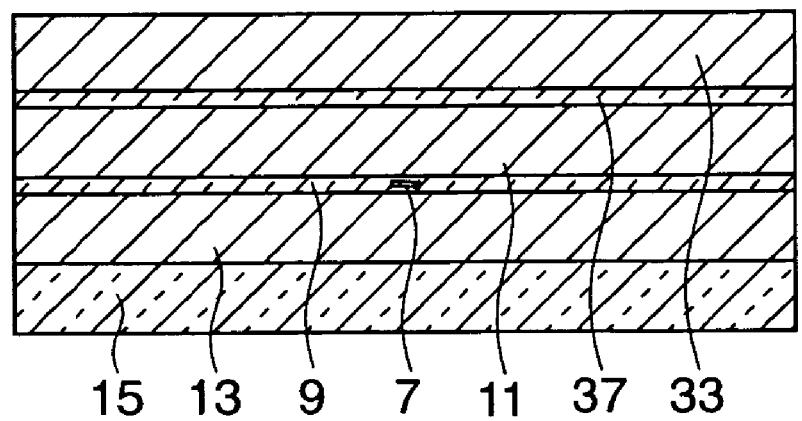
FIG. 4 is an end view of FIG. 3 seen from the ABS side.

Next, a method for manufacturing the thin-film magnetic head for perpendicular magnetic recording 1 according to the present embodiment with the above-mentioned constitution will be described. Referring to FIGS. 3 and 4, the lower-shield layer 13 is first formed so as to be 2.0 μm in thickness on a base body formed out of $Al_2O_3$-TiC or the like, for example. Next, the insulating layer 9, the inside thereof a magneto-resistance effect element 7 being arranged, is formed on the lower shield layer 13. In more details, the above-mentioned process contains two steps. In the first step, the lower shield layer 13 is covered with an alumina film and then the surface of the alumina film is flattened by CMP (chemical mechanical polish) treatment. After this, the magneto-resistance effect element 7 is shaped. In the second step, an alumina film covering the magneto-resistance effect element 7 is formed.

Next, the upper shield layer 11 is formed on the insulating layer 9 so as to be 1.5 μm in thickness, and the insulating layer 37 is formed thereon, and also the shield layer 33 is formed thereon so as to be 1.5 μm in thickness. FIGS. 3 and 4 show a state where the formation of shield layer 33 has been finished.

Figure 5:
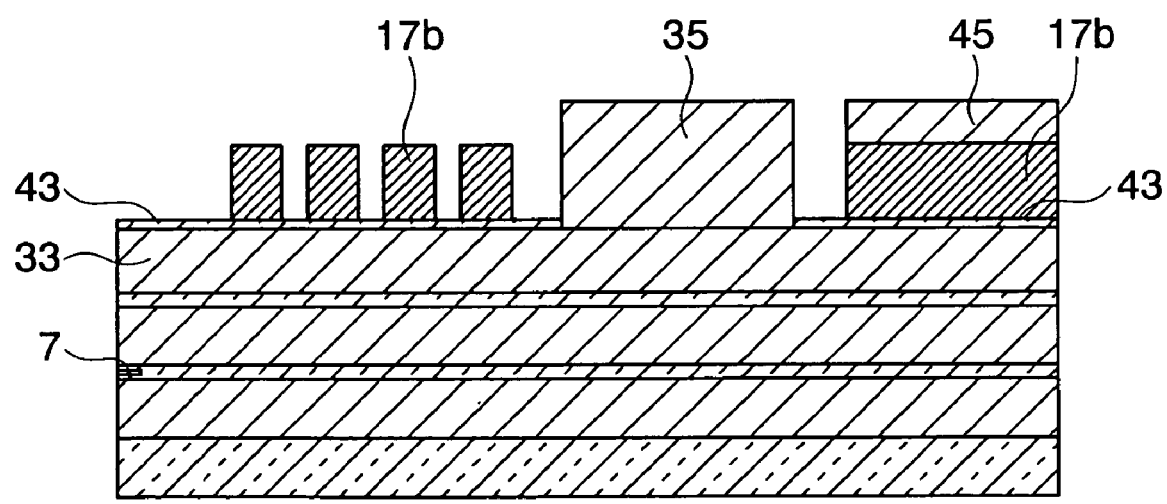
FIG. 5 is a diagram showing a process after the process shown in FIGS. 3 and 4.

Now referring to FIG. 5, the second coil portion is formed. First, on the upper surface of the shield layer 33, an insulating layer 43 is formed over a larger area than necessary for forming the second coil portion 17b. Next, a seed film is formed to cover the upper surface of the insulating layer 43 and the exposed upper surface of the shield layer 33. Formation of such a seed film may be conducted by means of a thin-film formation method such as CVD (chemical vapor deposition) or the like, for example.

Next, a photoresist film is formed on the seed film by applying the spin coat method or the like, for example. The photoresist film is then exposed to light, making use of a mask having a coil pattern, and is developed. This process produces a resist frame having a given pattern. The photoresist film may be either positive photoresist or negative photoresist. Next, Cu-plating process is conducted to make the second coil portion 17b grow so as to be 2.0 µm in thickness on the seed film existing inside the pattern for forming the coil.

Next, a photolithography process for forming the back-gap layer 35 and the magnetic layer 45 is conducted to construct a resist frame. The back-gap layer 35 is made to grow on the shield layer 33 by plating, and the magnetic layer 45 is also made to grow by plating on a part of the second coil portion 17b located opposite the medium-facing surface through the back-gap layer 35 therebetween.

Thereafter, the resist frame is removed by a procedure such as chemical etching or the like. Thus, a state illustrated in FIG. 5 is obtained. The magnetic layer 45 is formed out of magnetic material such as NiFe.

Figure 6:
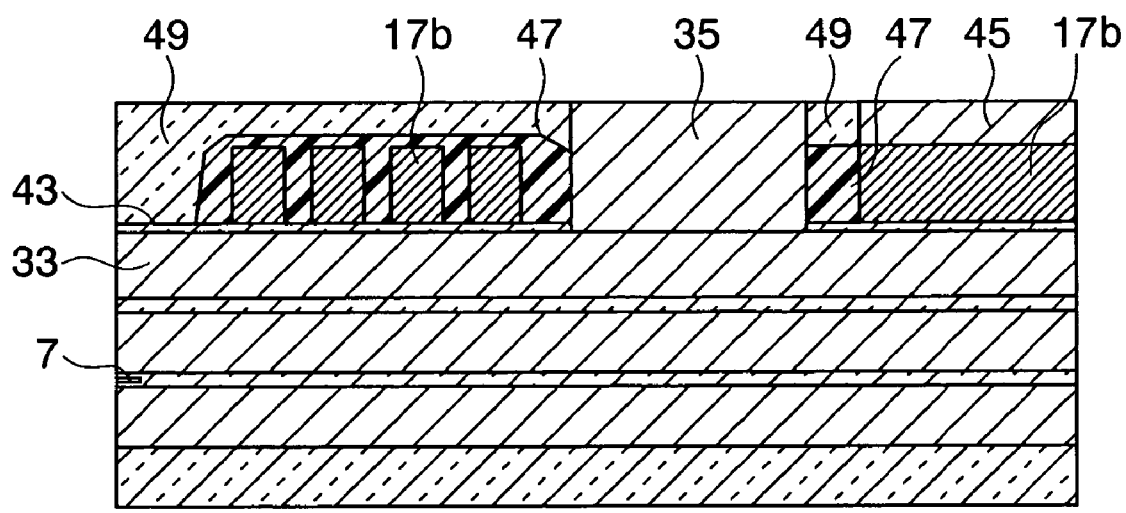
FIG. 6 is a diagram showing a process after the process shown in FIG. 5.
Figure 7:
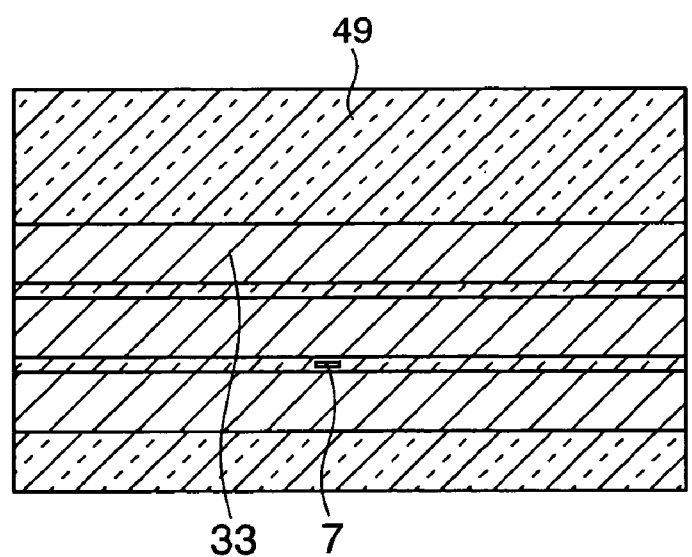
FIG. 7 is an end view of FIG. 6 seen from the ABS side.

Referring now to FIGS. 6 and 7, a photoresist film 47 is formed to cover the second coil portion 17b and the region between the back-gap layer 35 and the second coil portion 17b (located opposite the medium-facing surface through the back-gap layer 35 therebetween). Further, a non-magnetic layer 49 is formed to cover the photoresist film 47. The non-magnetic layer 49 is formed out of $Al_2O_3$, for example.

A state illustrated in FIGS. 6 and 7 is obtained, after the CMP treatment to flatten the surface so that the back-gap layer 35 becomes about 3.0 µm in thickness.

Figure 8:
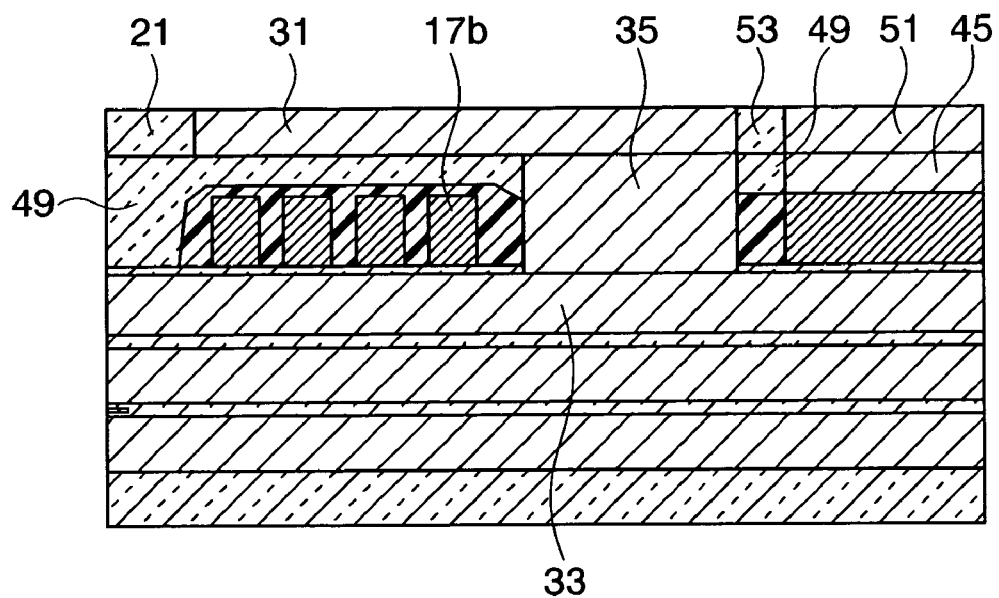
FIG. 8 is a diagram showing a process after the process shown in FIGS. 6 and 7.
Figure 9:
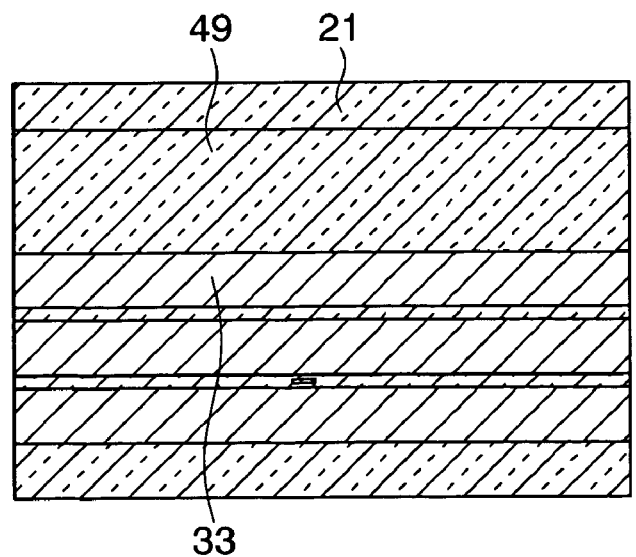
FIG. 9 is an end view of FIG. 8 seen from the ABS side.

Referring now FIGS. 8 and 9, making use of the photolithography process, the lower yoke-pole film 31 and a magnetic layer 51 are formed so as to be 1.0 µm in thickness at the region above the back-gap layer 35 and the second coil portion 17b and at the region above the magnetic layer 45, respectively. The medium-facing surface side end of the lower yoke-pole film 31 terminates at a position apart from the medium-facing surface. Non-magnetic layers 21 and 53 are also formed on the upper surface of the non-magnetic layer 49 near the medium-facing surface not covered by the lower yoke-pole film 31. A state illustrated in FIGS. 8 and 9 is thus obtained.

Figure 10:
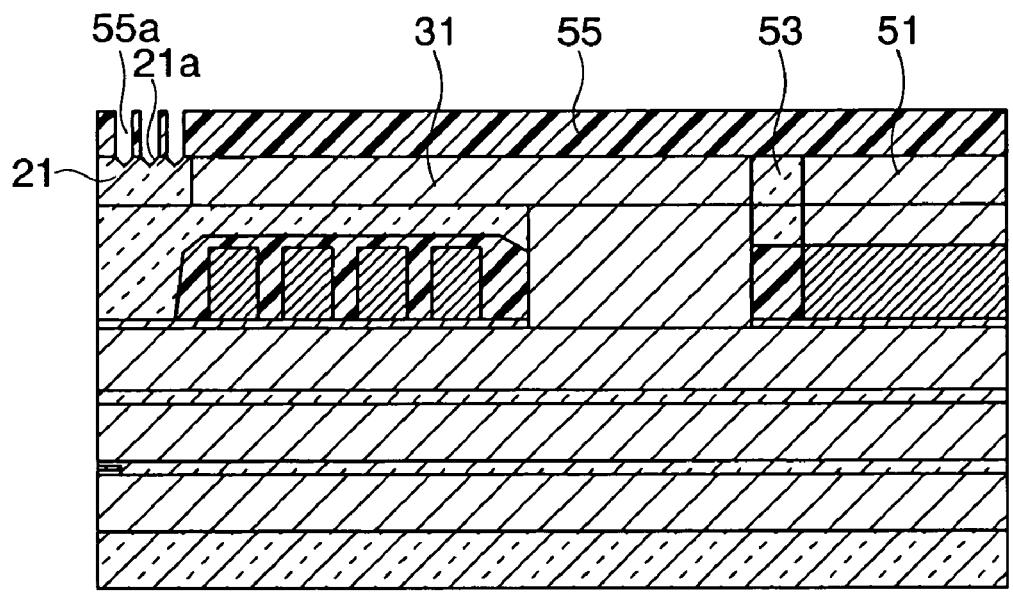
FIG. 10 is a diagram showing a process after the process shown in FIGS. 8 and 9.
Figure 11:
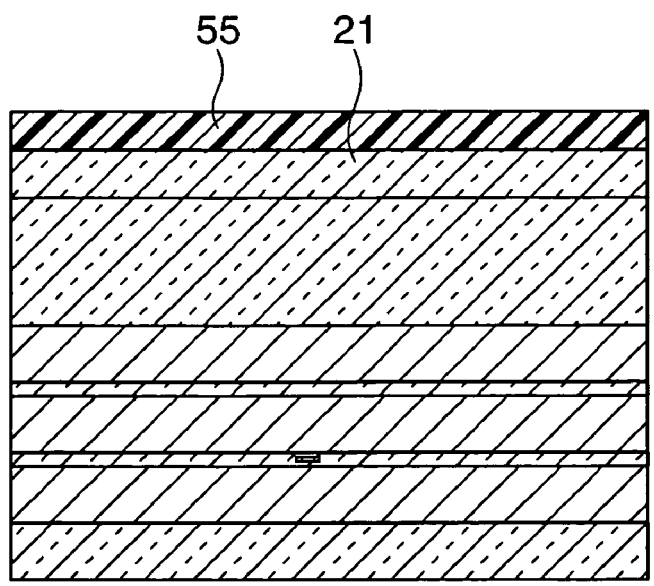
FIG. 11 is an end view of FIG. 10 seen from the ABS side.

Referring now to FIGS. 10 and 11, a photoresist film 55 is formed on the upper surfaces of the non-magnetic layer 21, the lower yoke-pole film 31, the magnetic layer 51 and the non-magnetic layer 53. And then, at the portion of the photoresist film 55 located above the non-magnetic layer 21, a plurality of parallel slits 55a elongated in the width direction, i.e., the direction perpendicular to the sheet plane of FIG. 10, are provided. By applying RIE (reactive ion etching) [$BCl_3$+$Cl_2$+$CF_4$] from above the photoresist film 55, irregularities 21a are formed at the upper surface of the non-magnetic layer 21. A plurality of irregularities 21a elongated in the width direction are formed in a parallel manner, corresponding to the slits 55a.

Moreover, the irregularities 21a are formed by providing grooves of 0.10 to 0.30 µm in depth, side faces thereof being tapered.

Figure 12:
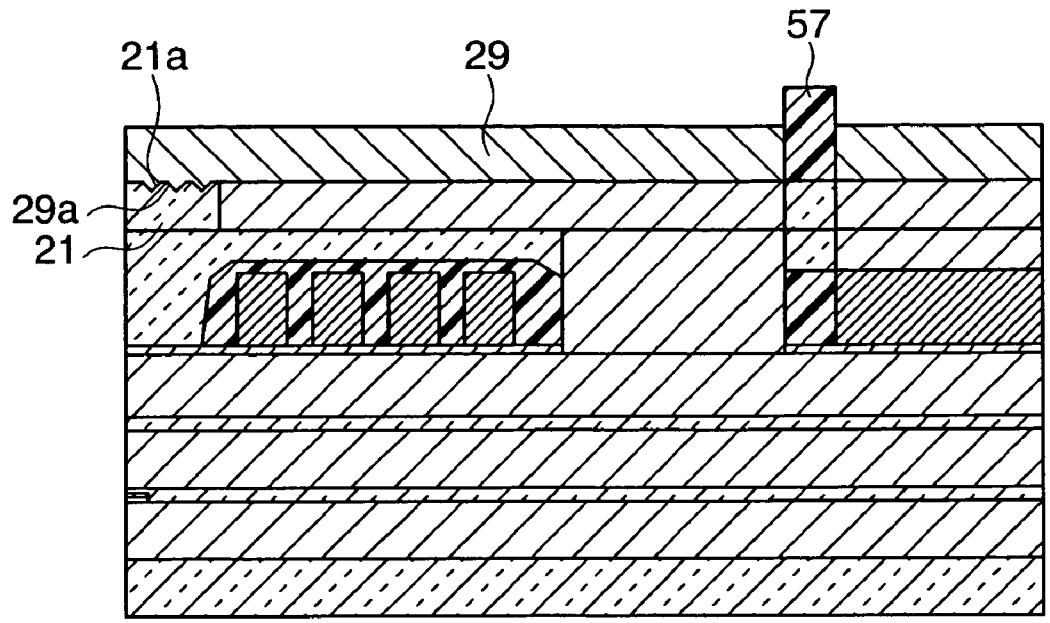
FIG. 12 is a diagram showing a process after the process shown in FIGS. 10 and 11.
Figure 13:
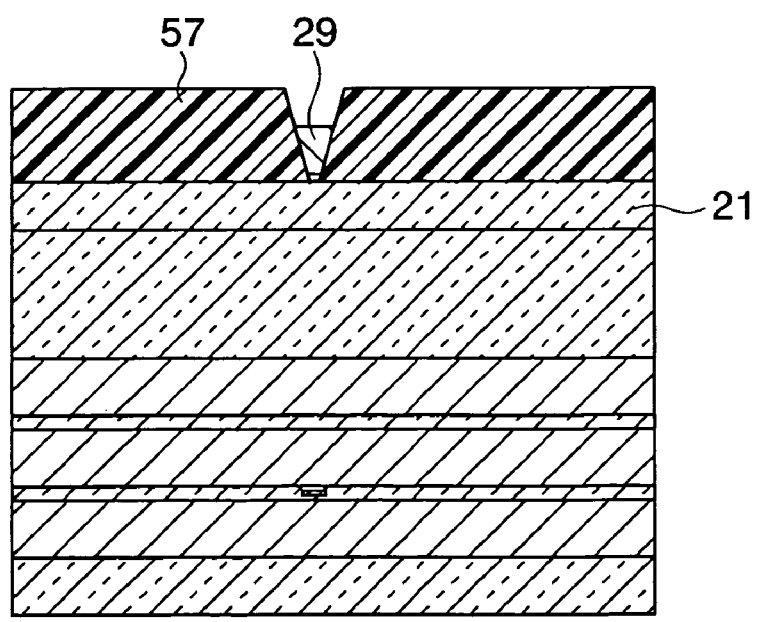
FIG. 13 is an end view of FIG. 12 seen from the ABS side.

Referring now to FIGS. 12 and 13, after removing once the photoresist film 55, a photoresist film 57 for forming the main pole film is formed. Next, a plating process is performed using the photoresist film 57 as a resist frame, and the main pole film 29 is formed. During the above plating process, at the lower surface as to the film-forming direction of the medium-facing surface side end of the main pole film 29, irregularities 29a corresponding to the irregularities 21a are formed at the position above the irregularities 21a in the non-magnetic layer 21. The crystal structure formed above the irregularities 29a as the base is less uniform compared with the other crystal structure formed above the flat surface without irregularities 29a as the base. The main pole film 29 is made to grow so as to be in a range of 0.50 to 0.70 µm in thickness.

Figure 14:
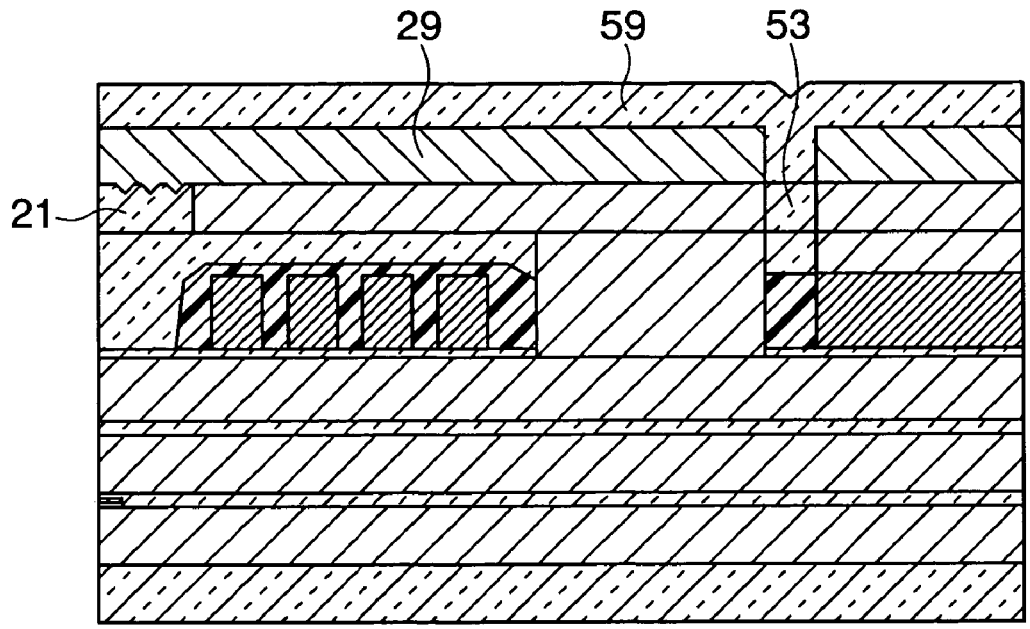
FIG. 14 is a diagram showing a process after the process shown in FIGS. 12 and 13.
Figure 15:
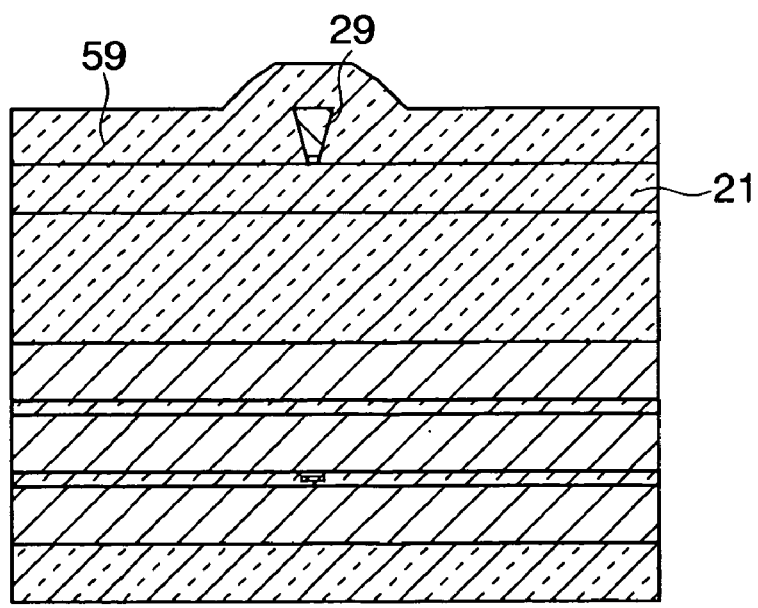
FIG. 15 is an end view of FIG. 14 seen from the ABS side.

Referring now to FIGS. 14 and 15, after removing the photoresist film 57 for forming the main pole film, a non-magnetic layer 59 is formed to cover the main pole film 29 and the non-magnetic layer 53. The non-magnetic layer 59 is formed also out of $Al_2O_3$, for example.

Figure 16:
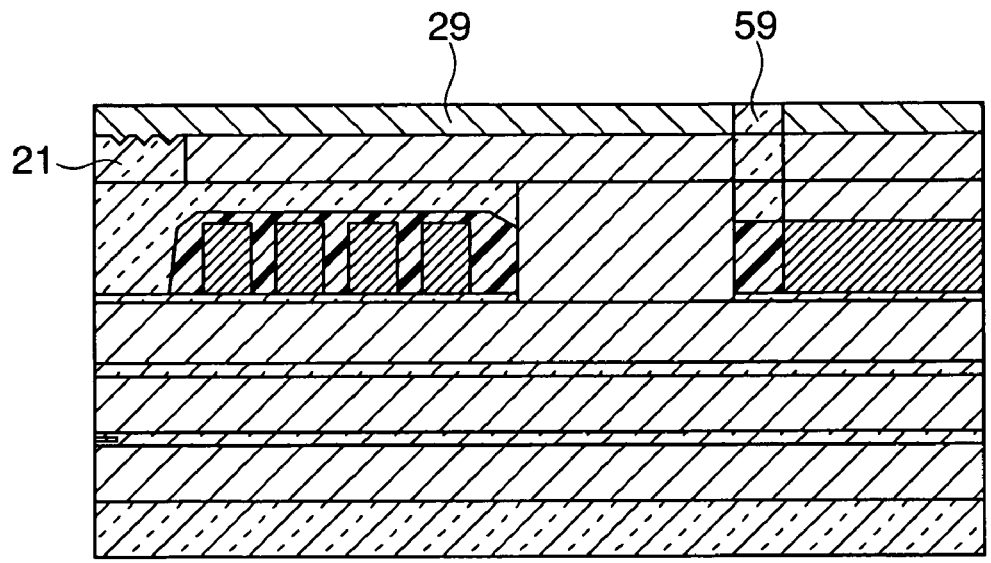
FIG. 16 is a diagram showing a process after the process shown in FIGS. 14 and 15.
Figure 17:
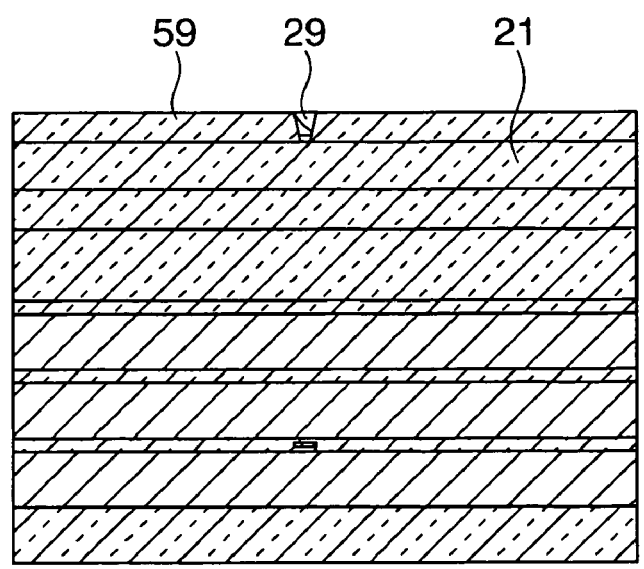
FIG. 17 is an end view of FIG. 16 seen from the ABS side.

Referring next to FIGS. 16 and 17, the surface is flattened by CMP treatment so that the main pole film 29 becomes about 0.20 to 0.35 µm in thickness.

Figure 18:
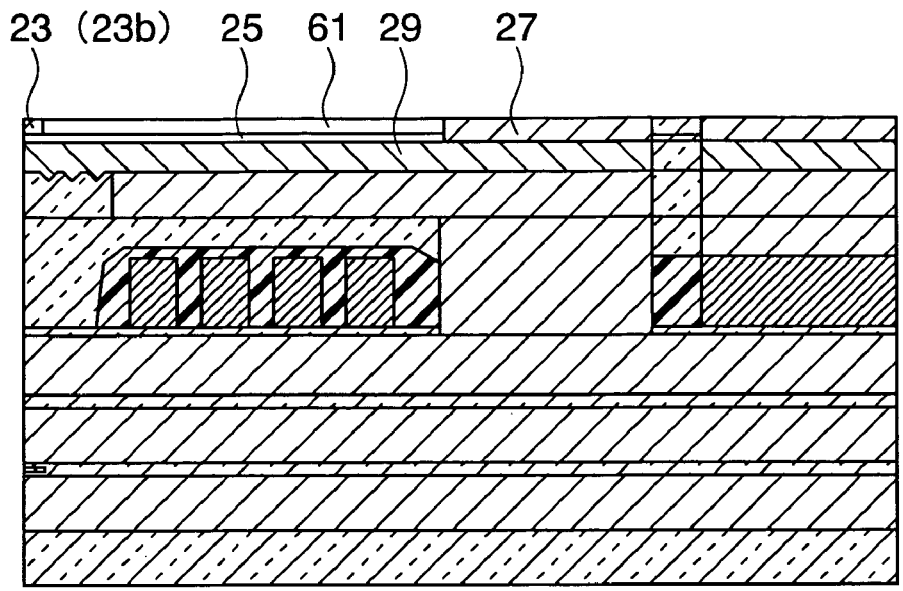
FIG. 18 is a diagram showing a process after the process shown in FIGS. 16 and 17.
Figure 19:
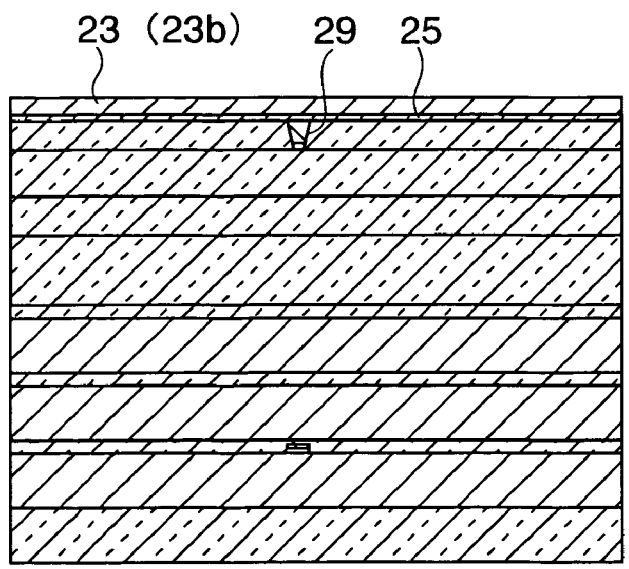
FIG. 19 is an end view of FIG. 18 seen from the ABS side.

Referring now FIGS. 18 and 19, the write-gap layer 25 is formed on the upper surface of the main pole film 29 so as to be 400 to 500 Å in thickness. Further, as shown in the figures, a magnetic layer constituting a part of the write-shield layer 23 and a magnetic layer constituting a part of the back-gap layer 27 are formed, and then an insulating layer 61 is formed on the upper surface of the write-gap layer 25. Then, the surface is flattened by CMP treatment. CMP treatment is conducted until the magnetic layers of 0.50 to 0.70 µm in thickness become about 0.25 to 0.50 µm in thickness.

Figure 20:
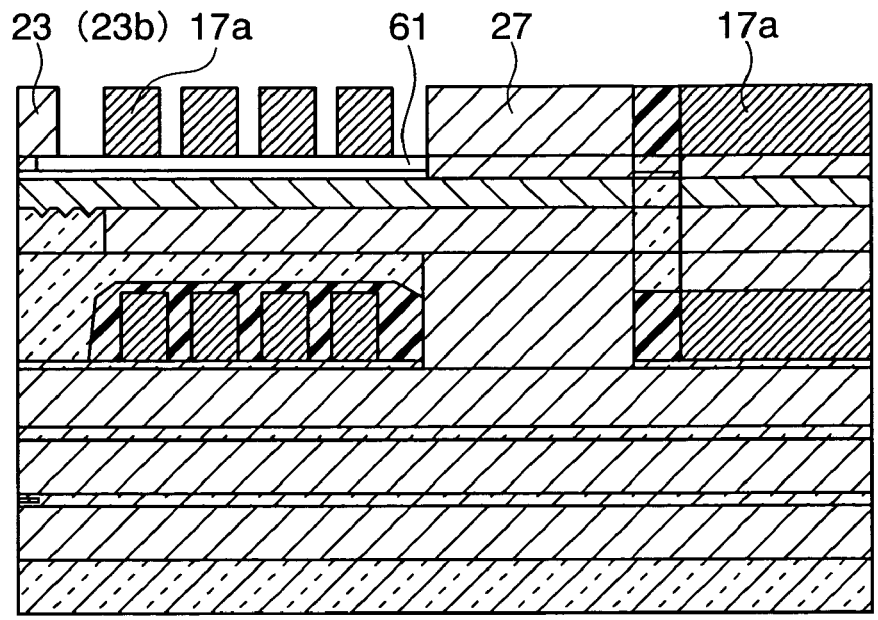
FIG. 20 is a diagram showing a process after the process shown in FIGS. 18 and 19.
Figure 21:
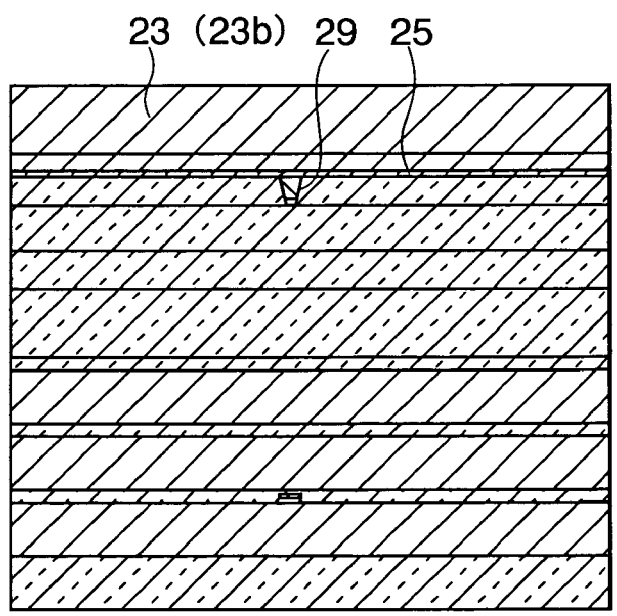
FIG. 21 is an end view of FIG. 20 seen from the ABS side.

Referring next to FIGS. 20 and 21, the first coil portion 17a is shaped on the upper surface of the insulating layer 61, and a magnetic layer constituting a part of the write-shield layer 23 and a magnetic layer constituting a part of the back-gap layer 27 are formed as well. The first coil portion 17a and the magnetic layers are formed so as to be 2.0 µm in thickness. A state illustrated in FIGS. 20 and 21 is thus obtained. After these processes, a photoresist film 47 is formed between the Cu-layer of the first coil portion 17a and the magnetic layers; and an insulating layer formed out of $Al_2O_3$, for example, is formed to cover the photoresist film 47 and the Cu-layer of the first coil portion 17a. Next, by forming a magnetic layer on the region above the main pole film 29, the write-shield layer 23 is completed, and a state illustrated in FIGS. 1 and 2 is obtained.

In the thin-film magnetic head for perpendicular magnetic recording 1 manufactured by the method described above, the medium-facing surface side end of the main pole film 29 constituting a part of the main pole layer 19 has less uniform crystal structure compared with other regions of the main pole film.

Figure 22:
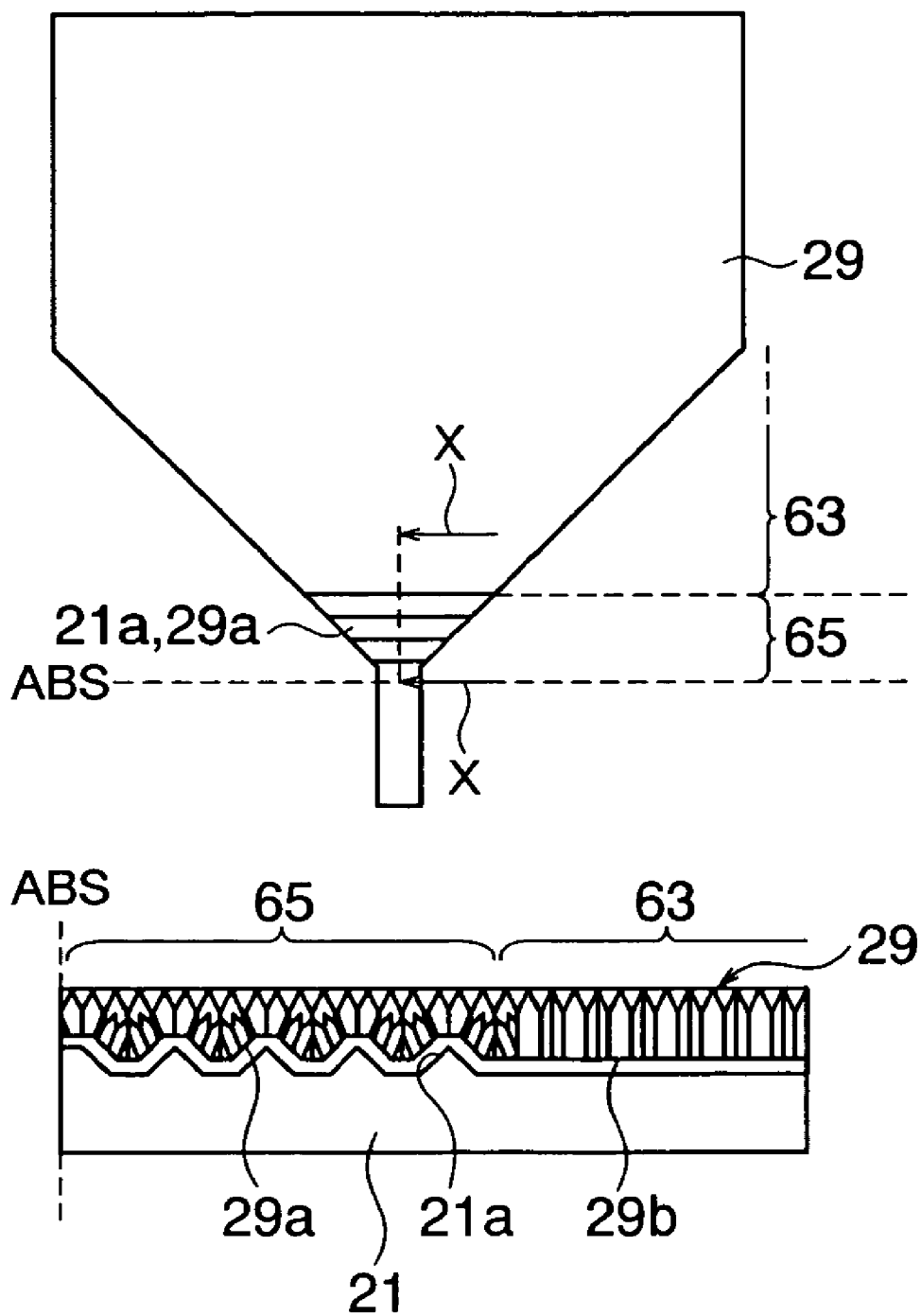
FIG. 22 is a diagram illustrating features in the formation of irregularities and the crystal structure of the main pole film, with regards to the thin-film magnetic head for perpendicular magnetic recording shown in FIGS. 1 to 21.

Referring to FIG. 22, the above situation is explained. In FIG. 22, the main pole film 29 is shown in a plan view, and the crystal structure thereof is also schematically shown in a sectional view at the X-X line. As shown in FIG. 22, in the crystal structure of a part 63 in the main pole film which is based on a flat plane 29b without irregularities 29a, the crystal grows uniformly from below to above in the film-forming direction. In contrast to the above, in the crystal structure of a part 65 which is based on the irregularities 29a, the crystal does not grow straight upward in the film-forming direction, that is, does not grow in a uniform manner.

Thus, in the present invention, due to the existence of nonuniform crystal structure at the medium-facing surface side end of the main pole film 29, the residual magnetic field generated in the head during the write operation can be prevented from progressing toward the recording medium.

Therefore, the pole erasure phenomenon that, while the write operation is at rest, the residual magnetic field leaks out toward the recording medium and erroneously erases the already recorded information can be prevented.

The present invention is not limited to the above embodiment, but is possible to be implemented under the following modification and variation, for example.

Figure 23:
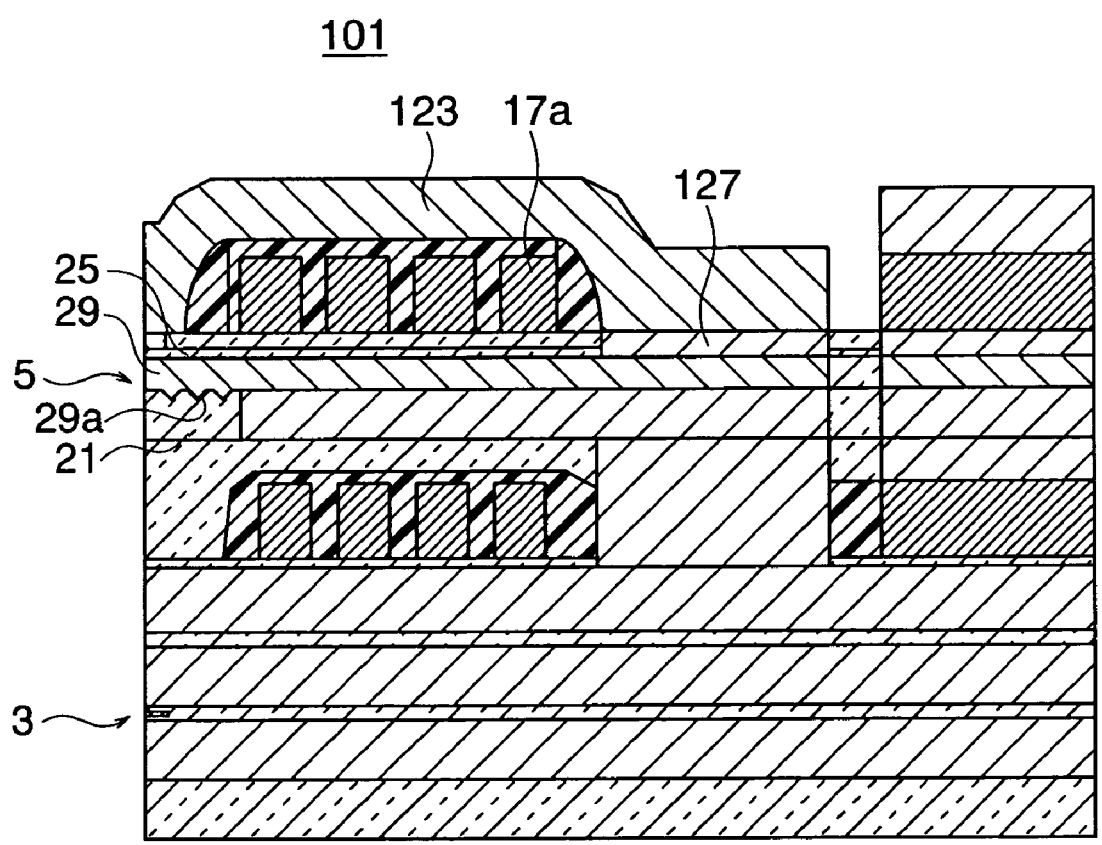
FIG. 23 is a figure corresponding to FIG. 1 in another embodiment according to the present invention.

First, the present invention is not confined to the above embodiment with regard to the structure of the write-shield layer. As shown in FIG. 23, the present invention is implemented also as a thin-film magnetic head for perpendicular magnetic recording 101 comprising a write-shield layer 123 with an upward swelling shape near the region covering the first coil portion 17a.

Also in the thin-film magnetic head for perpendicular magnetic recording 101, due to the existence of nonuniform crystal structure at the medium-facing surface side end of the main pole film 29, the residual magnetic field can be prevented from progressing toward the recording medium, and thus the pole erasure phenomenon can be prevented.

Figure 24:
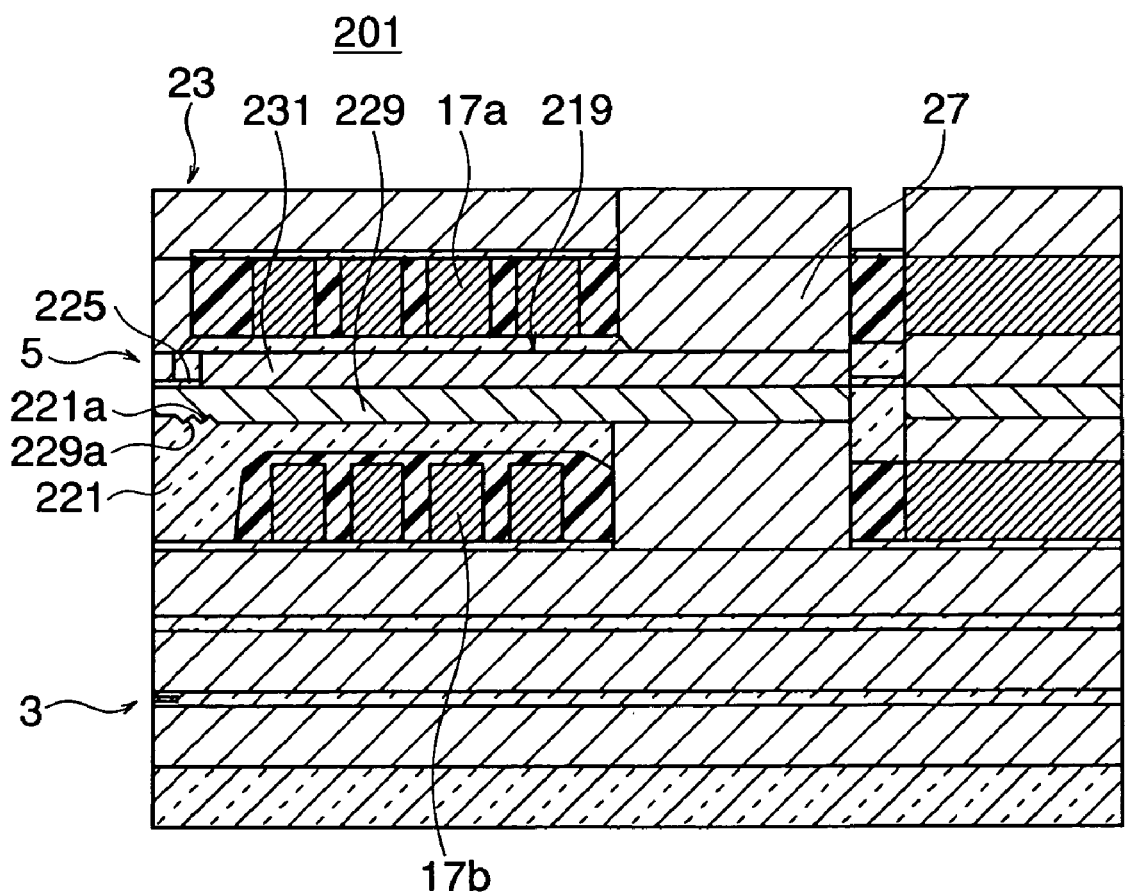
FIG. 24 is a figure corresponding to FIG. 1 in yet another embodiment according to the present invention.

In FIG. 24, an embodiment in which the constitution of the main pole layer is modified is further shown. As shown in FIG. 24, a thin-film magnetic head for perpendicular magnetic recording 201 has a main pole layer 219 comprising a main pole film 229 and an upper yoke-pole film 231.

The main pole film 229 is provided under the lower surface of the upper yoke-pole film 231. The medium-facing surface side end of the upper yoke-pole film 231 terminates at a position more distant from the medium-facing surface than the medium-facing surface side end of the main pole film 229.

At a position which is above the main pole film 229 and also is on the lateral of the medium-facing surface side of the upper yoke-pole film 231, a write-gap layer 225 is provided. On the other hand, below the main pole film 229, a non-magnetic layer 221 is provided.

At the lower surface of the end part of the main pole film 229 on the medium-facing surface side, irregularities 229a are formed. Further, corresponding to the irregularities 229a at the lower surface of the main pole film 229, irregularities 221a are formed at the upper surface of a part of the non-magnetic layer 221 whereupon the main pole film 229 is formed.

Again in the thin-film magnetic head for perpendicular magnetic recording 201, due to the existence of the nonuniform crystal structure at the end part of the main pole film 229 on the medium-facing surface side, the residual magnetic field can be prevented from progressing toward the recording medium, and thus the pole erasure phenomenon can be prevented.

Figure 25:
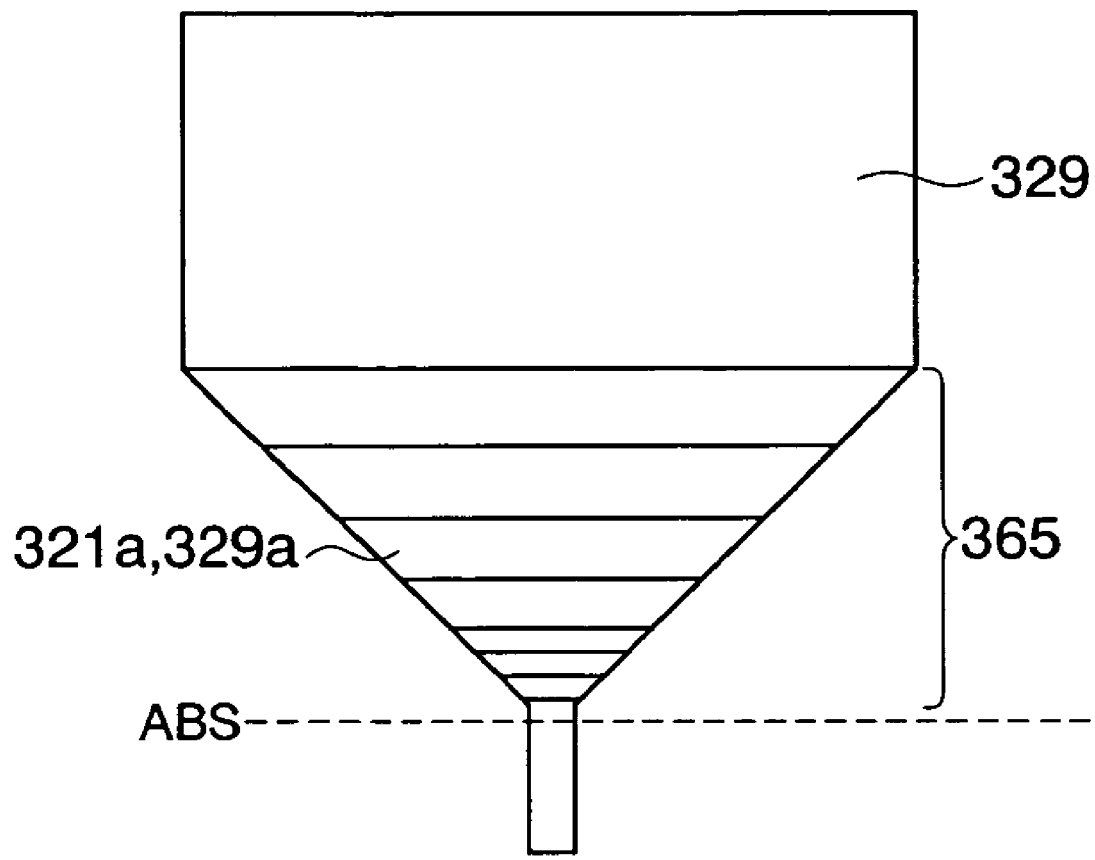
FIG. 25 is a diagram illustrating features in the formation of irregularities on the main pole film in another embodiment of the thin-film magnetic head for perpendicular magnetic recording according to the present invention.
Figure 26:
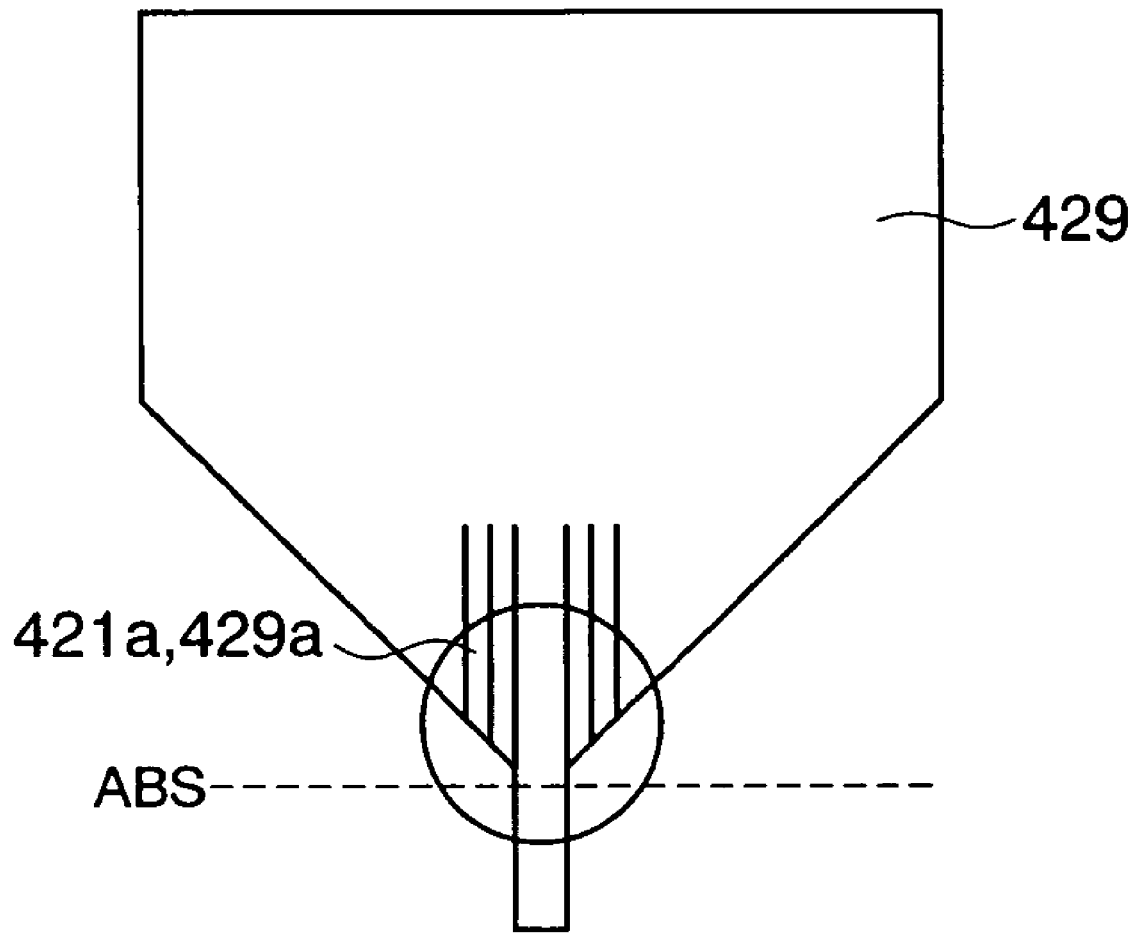
FIG. 26 is a diagram illustrating features in the formation of irregularities on the main pole film in yet another embodiment of the thin-film magnetic head for perpendicular magnetic recording according to the present invention.

Further, the present invention is not confined to the above embodiment with regard to the manner to form the irregularities. As shown in FIG. 25, the irregularities 321a and 329a may be formed on the entire region 365 where the width of the main pole film 329 varies. Alternatively, as shown in FIG. 26, the irregularities 421a and 429a in the main pole film 429 may be formed with the grooves elongated in the direction perpendicular to the medium-facing surface (ABS).

In such embodiments modified with regard to manners to form the irregularities, due to existence of nonuniform crystal structure at the end part of the main pole films 329 or 429 on the medium-facing surface side, the residual magnetic field can also be prevented from progressing toward the recording medium, and thus the pole erasure phenomenon can be prevented.

Although the contents of the present invention have been concretely described above with reference to the preferred embodiments, it is self-evident that those skilled in the art can take various variations on the basis of the basic technical idea and teachings of the present invention.

What is claimed is:

1. A thin-film magnetic head for perpendicular magnetic recording comprising:
    a coil to generate a magnetic field and a main pole layer to perform perpendicular recording by the magnetic field generated by said coil, wherein:
    at an end part of said main pole layer on a medium-facing surface side, irregularities are provided at the lower surface of said main pole layer in a film-forming direction, wherein said irregularities on said main pole layer includes a plurality of grooves elongated in a given direction.

2. A thin-film magnetic head for perpendicular magnetic recording according to claim 1, further comprising a non-magnetic layer having irregularities at the upper surface of the non-magnetic layer, said non-magnetic layer being provided under said main pole layer as to the layer-forming direction.

3. A thin-film magnetic head for perpendicular magnetic recording according to claim 1, further comprising a write-shield layer opposite to said main pole layer with at least a part of said coil being sandwiched therebetween.

4. A thin-film magnetic head for perpendicular magnetic recording according to claim 3, wherein:
    said irregularities provided on said main pole layer are located on side of said main pole layer opposite to said write-shield layer.

5. A thin-film magnetic head for perpendicular magnetic recording according to claim 1, further comprising a read element below said main pole layer as to the layer-forming direction.

6. A thin-film magnetic head for perpendicular magnetic recording according to claim 1, wherein:
    said grooves are elongated in parallel or perpendicularly as to the direction of extension of the medium-facing surface.

7. A thin-film magnetic head for perpendicular magnetic recording according to claim 1, wherein:
    said coil has a first coil portion above said main pole layer as to the film-forming direction.

8. A thin-film magnetic head for perpendicular magnetic recording according to claim 7, wherein:
    said coil has a second coil portion below said main pole layer as to the film-forming direction.

9. A thin-film magnetic head for perpendicular magnetic recording according to claim 1, wherein:
    said coil has at least one coil portion going repeatedly around said main pole layer as a coiling axis.

10. A thin-film magnetic head for perpendicular magnetic recording according to claim 1, wherein: differences in elevation between tops and bottoms of said irregularities formed at the upper surface of said non-magnetic layer are 0.1 to 0.3 μm.

11. A thin-film magnetic head for perpendicular magnetic recording according to claim 1, wherein:
    said main pole layer is 0.20 to 0.35 μm in thickness.

12. A method for manufacturing a thin-film magnetic head for perpendicular magnetic recording including a main pole layer to perform perpendicular recording above a non-magnetic layer as to the layer-forming direction, comprising the steps of:

forming irregularities at the upper surface of said non-magnetic layer;

next forming said main pole layer on the upper surface of said non-magnetic layer at least covering a region containing said irregularities;

next shaping a coil above said main pole layer in order to generate the magnetic field for performing perpendicular recording, and said irregularities on said non-magnetic layer are formed by making elongated grooves in a given direction by an etching process.

* * * * *